United States Patent [19]

Chi et al.

[11] 4,371,825
[45] Feb. 1, 1983

[54] METHOD OF MINIMIZING THE EFFECTS OF PARASITIC CURRENTS

[75] Inventors: Michael C. Chi, Cerritos, Calif.; Peter Carr, Utica, Mich.

[73] Assignee: Energy Development Associates, Inc., Madison Heights, Mich.

[21] Appl. No.: 270,481

[22] Filed: Jun. 4, 1981

[51] Int. Cl.³ .......................................... H01M 10/44
[52] U.S. Cl. ...................................... 320/5; 307/327; 320/8; 320/17; 429/123
[58] Field of Search ...................... 307/327; 320/5-8, 320/14, 17; 429/123, 150

[56] References Cited

U.S. PATENT DOCUMENTS

| | | | |
|---|---|---|---|
| 613,918 | 11/1898 | Chamberlain et al. | |
| 1,967,802 | 7/1934 | Beedle | 320/17 |
| 2,904,739 | 9/1959 | Reed, Jr. | 320/7 |
| 3,249,836 | 5/1966 | Stamm | 318/17 |
| 3,356,857 | 12/1967 | Strasen et al. | 307/66 |
| 3,522,098 | 7/1970 | Sturm et al. | 429/18 |
| 3,524,769 | 8/1970 | Sturm et al. | 429/14 |
| 3,623,139 | 11/1971 | Dickerson | 320/22 |
| 3,664,876 | 5/1972 | Carl | 136/160 |
| 3,713,888 | 1/1973 | Symons | 136/6 |
| 3,773,559 | 11/1973 | Warszawski et al. | 136/86 B |
| 3,773,561 | 11/1973 | Bjorkman | 429/15 |
| 3,930,192 | 12/1975 | Dinkler | 320/15 |
| 4,017,779 | 4/1977 | McDonald et al. | 320/15 |
| 4,025,697 | 5/1977 | Hart | 429/70 |
| 4,049,878 | 9/1977 | Lindstrom | 429/18 |
| 4,079,303 | 3/1978 | Cox | 320/17 |
| 4,100,332 | 7/1978 | Carr | 429/27 |
| 4,129,817 | 12/1978 | Yew et al. | 320/15 |
| 4,131,833 | 12/1978 | McAuliffe et al. | 320/18 |
| 4,139,812 | 2/1979 | Huggins | 320/7 |
| 4,197,169 | 4/1980 | Zahn et al. | 204/1 R |
| 4,297,629 | 10/1981 | Godard et al. | 320/7 |

OTHER PUBLICATIONS

Carr, Chi & Symons, "Proceedings of the 28th Power Sources Symposium", Jun., 1978, pp. 23-26.

Primary Examiner—William M. Shoop
Attorney, Agent, or Firm—Harness, Dickey & Pierce

[57] ABSTRACT

A method of minimizing the effect of parasitic currents in secondary batteries having a plurality of cells connected electrically in series and a common electrolyte in communication with the cells is described. Specifically, the parasitic currents flowing through the battery cause a cell imbalance over the charge/discharge cycle. This cell imbalance is minimized by first separating the cells of the battery into two equal groups. Then the battery is charged with the two groups of cells connected electrically in series, and subsequently discharged with the two groups of cells reconnected electrically in series in an inverted sequence.

24 Claims, 8 Drawing Figures

METHOD OF MINIMIZING THE EFFECTS OF PARASITIC CURRENTS

The Government of the United States of America has rights in this invention pursuant to Contract No. DE-AC02-76ET20131 awarded by the U. S. Department of Energy.

BACKGROUND AND SUMMARY OF THE INVENTION

The present invention relates generally to electrochemical energy storage devices, and particularly to multiple-cell secondary batteries having a common electrolyte.

The present invention is directed to minimizing the effect of parasitic currents in secondary batteries having a plurality of cells connected electrically in series and a common electrolyte in communication with the cells. Parasitic currents are those electrical currents which flow in the conductive paths created by the network of electrolytic connections linking the cells. In the case of batteries having a circulating electrolyte, these electrolytic connections include conduits for supplying electrolyte to the cells from a reservoir, as well as conduits for returning the electrolyte to the reservoir from the cells. The conduits act as shunt resistors connected across the battery cells, whose effect is to cause a limited current to flow discharging the cells. This parasitic discharge current will oppose the direction of the charge current during the charging of the battery, and thereby reduce the amount of the charge current utilized to charge the battery cells. The parasitic discharge current will also flow during the discharging of the battery, and even when the battery is not connected to a load. In fact, the parasitic discharge currents will only cease to flow when the battery is completely discharged, or the battery is in an open circuit condition and one or both reactant species is denied access to the electrodes or there is insufficient electrolyte in the conduits to create the necessary conductive paths. Accordingly, parasitic currents are considered to be highly undesirable, and many attempts have been made to reduce or eliminate parasitic currents (also known as shunt currents) in multiple-cell batteries. Reference may be had to U.S. Pat. No. 4,197,169, entitled "Shunt Current Elimination and Device", issued on Apr. 8, 1980 to Zahn et al, for a discussion of the many and various attempts made. However, as stated above, the present invention is not directed to reducing or eliminating parasitic currents per se, but rather to minimizing the effect of the parasitic currents. Specifically, the present ivention is directed to minimizing cell imbalances in multiple-cell batteries which result due to the flow of parasitic currents over a charge/discharge cycle.

The term cell imbalance generally refers to performance differences between the cells in the battery. There may be, of course, many causes and reasons for variations in performance between the cells, such as manufacturing tolerances or assembling procedures. While these and other similar causes create cell imbalances which are random in nature, the cell imbalance resulting from parasitic currents follow a predetermined pattern and the magnitude of these imbalances are predictable in nature. Briefly, the slow discharge of the cells caused by the flow of parasitic currents is not uniform with respect to each of the cells in the battery. Rather, the parasitic discharge current flowing through each cell is dependent upon its relative position in the battery, with the cells at the ends of the battery having a lower parasitic discharge current than the cells in the center of the battery. For example, if the battery is comprised of 60 cells connected electrically in series, the end cells (Nos. 1 and 60) will have a lower parasitic discharge current than the center cells (Nos. 30 and 31). As will be more fully appreciated from the detailed description below, the parasitic discharge current gradually increases from the end cells to the central cells, such that the end cells (Nos. 1 and 60) will experience the lowest parasitic discharge current and the center cells (Nos. 30 and 31) will experience the highest parasitic discharge current.

During the charging of the battery, the parasitic discharge current will oppose the direction of the charge current, and thereby reduce the amount of the charge current utilized to charge the battery cells. Accordingly, the center cells of the battery will be charging at a lower rate than the end cells. During the discharging of the battery, the parasitic discharge current will have the same direction as the discharge current. The parasitic discharge current will then be added to the discharge current, and thereby increase the total amount of current utilized to discharge the battery cells. Accordingly, the center cells of the battery will be discharging at a higher rate than the end cells. Thus, over the charge/discharge cycle the cells which were charged at a lower rate will be discharged at a higher rate, and the cells which were charged at a higher rate will be discharged at a lower rate. This imbalance will cause an uneven discharge of the battery cells, such that the center cells will be discharged before the end cells. This will not only reduce the electrochemical efficiency achievable for a single charge/discharge cycle, but the cell imbalance will also become more pronounced during subsequent cycles unless the battery is fully discharged each cycle.

Accordingly, it is a principal object of the present invention to minimize cell imbalances due to parasitic currents over a charge/discharge cycle in a secondary battery having a plurality of cells connected electrically in series and a common electrolyte in communication with the cells.

The present invention provides a method of minimizing cell imbalances whereby the battery is in effect divided into two groups of cells, with the cells in each group connected electrically in series. The battery is charged with the two groups of cells connected electrically in series, and then discharged with the two groups of cells reconnected electrically in series in an inverted sequence. Accordingly, in the 60 cell battery example described above, the battery would be charged with cell Nos. 30 and 31 connected electrically together, and cells 1 and 60 connected across a suitable d.c. power supply. Then the battery would be discharged in the inverted sequence, where cell Nos. 1 and 60 are connected electrically together and cell Nos. 30 and 31 are connected across a suitable loaded. Thus, it will be seen that the cells which experienced the greatest parasitic discharge current losses during charging, will also experience the least parasitic discharge current increases during discharging. Similarly, the cells which experienced the least parasitic discharge current losses during charging, will also experience the greatest parasitic discharge current increases during discharging.

Additional advantages and features of the present invention will become apparent from a reading of the detailed description of the preferred embodiments which makes reference to the following set of drawings in which:

DETAILED DESCRIPTION OF THE PREFERRED EMBODIMENTS

As an aid to understanding the nature and effects of parasitic currents on secondary batteries over a charge/discharge cycle, a circuit model for a single cell and a circuit model for a ten cell battery will be utilized. These circuit models employ standard circuit components, and are intended to simulate the conductive paths created by the electrolytic connections linking the cells, as well as the cells themselves. These circuit models may then be used to determine the direction and magnitude of the parasitic currents by conventional circuit analysis techniques. It should be understood that these circuit models are general in nature, and may be applied to a variety of secondary batteries having a common electrolyte in communication with the cells of the battery. However, these circuit models have particular application to the zinc-chloride battery, which provided the basis for developing the circuit models.

Briefly, the zinc-chloride battery is a secondary battery which includes a plurality of cells and a common aqueous electrolyte which circulates through the cells. Each cell generally comprises a pair of electrode substrates separated by a suitable gap which is filled with a portion of the electrolyte. The cells are typically connected electrically in parallel to form unit cells, and then these unit cells are connected electrically in series to form cell stacks. A zinc-chloride battery may include one or more of these cell stacks depending upon the energy storage capacity desired for the battery. In order to circulate the electrolyte through the cells, an electrolyte reservoir is usually provided from which the electrolyte may be pumped or otherwise supplied to the cells and to which the electrolyte may be returned from the cells. Additionally, a network of manifolds, conduits, or tubing is provided to distribute the electrolyte uniformly to each of the cells in the battery and to permit the electrolyte to drain from or otherwise return to the electrolyte reservoir. A more detailed discussion of zinc-chloride batteries and their operation may be found in the following patents and publications, which are herein incorporated by reference: U.S. Pat. No. 3,713,888 issued Jan. 30, 1973, entitled "Process For Electrical Energy Using Solid Halogen Hydrates"; U.S. Pat. No. 4,100,332 issued on July 11, 1978, entitled "Comb Type Bipolar Electrode Elements and Battery Stacks Thereof"; and a publication entitled "50 kW-hr Zinc-Chlorine Hydrate Battery", from the Proceedings of the 28th Power Sources Symposium, High Temperature/High Energy Systems Session, June, 1978.

Figure 1:
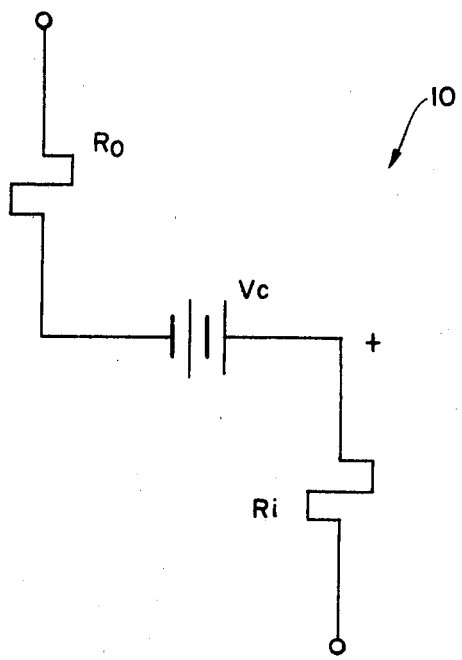
FIG. 1 is a schematic diagram of a circuit model for a single cell of a secondary battery having a circulating electrolyte.

Referring to FIG. 1, a schematic diagram of a single cell circuit model 10 for a secondary battery having a circulating electrolyte is shown. The single cell circuit model 10 is comprised of an independent voltage source $V_c$, an electrolytic resistance $R_i$, and an electrolytic resistance $R_o$. The voltage source $V_c$ is used to model the voltage across the cell, and includes the various internal voltage losses associated with the cell. As will be appreciated by those skilled in the art, the magnitude of this voltage will vary during the charge/discharge cycle. For example, in the zinc-chloride battery this voltage will have a typical value of 2.18–2.25 (volts) during the charging of the battery, 2.12 (volts) during an open-circuit condition, and 1.98–1.6 (volts) during the discharging of the battery. The electrolytic resistance $R_i$ is used to model the conduit supplying electrolyte to the cell, and represents the resistance associated therewith. The electrolytic resistance $R_o$ is used to model the conduit draining or returning the electrolyte to the reservoir, and represents the resistance associated therewith. Unlike the cell voltage, the magnitude of these resistances is assumed to be constant for both charge and discharge of the battery. Although the resistivity of the electrolyte will vary during the cycle, the average value of the resistivity will be the same for both the charge and the discharge of the battery. The electrolytic resistance $R_i$ is connected to the positive side of the voltage source $V_c$, and the electrolytic resistance $R_o$ is connected to the negative side of the voltage source. As will be apparent from the discussion of the battery circuit model of FIG. 2, this convention insures that all of the electrolytic resistances are separated by the voltage across a single cell. This convention also closely models the zinc-chloride battery, wherein the conduit supplying electrolyte to the cell typically empties into a cavity formed in the positive electrode substrate. It should also be noted that the single cell circuit model 10 may be applied both to an electrode substrate pair forming a single cell or a unit cell of the type described for the zinc-chloride battery. This is principally due to the fact that all of the single cells in the unit cell are connected electrically in parallel, and would therefore all have the same voltage across them.

Figure 2:
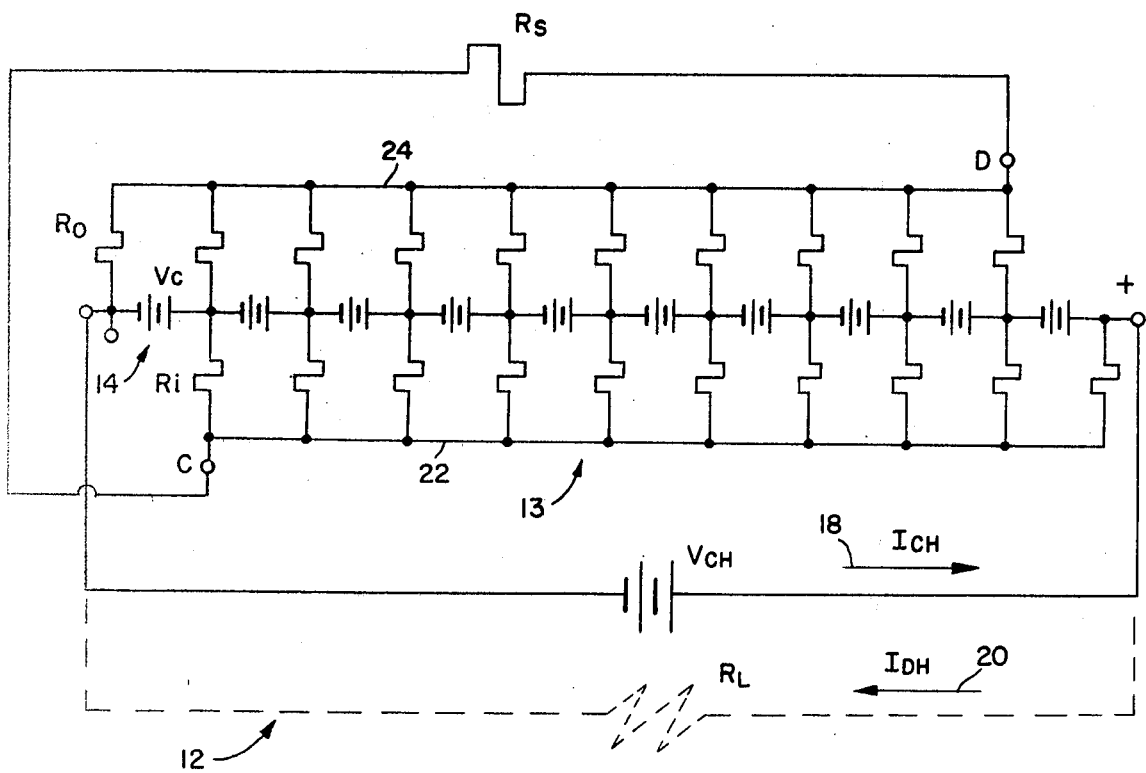
FIG. 2 is a schematic diagram of a circuit model for a ten cell secondary battery incorporating the cell model of FIG. 1.

Referring to FIG. 2, a schematic diagram of a circuit model 12 for a ten cell battery is shown. The single cell circuit model 10 of FIG. 1 provides the basic building block from which the battery circuit model 12 is constructed. Accordingly, the battery circuit model 12 generally comprises ten of the single cell circuit models 10 with the voltage sources $V_c$ connected electrically in series to form a cell stack 13. A negative terminal A and a positive terminal B are provided at the ends of the cell stack 13 so that the battery may be connected to a suitable source of d.c. electrical power or a suitable resistive load. The negative terminal A extends from the negative side of an end cell 14, and the positive terminal B extends from the positive side of an end cell 16.

An independent voltage source $V_{ch}$ is connected to the negative terminal A at one end and to the positive terminal B at the other end, across the cell stack 13, to charge the battery. The voltage source $V_{ch}$ provides a charging current $I_{ch}$ flowing in the direction of the arrow 18, in accordance with the standard current convention. A resistive load $R_{dh}$ is also shown (in phantom lines) connected across the cell stack 13 to discharge the battery. When it is desired to discharge the battery, the resistive load $R_{dh}$ will be connected across the cell stack 13 in the place of the voltage source $V_{ch}$, as is the standard practice in the art. The resistive load $R_{dh}$ will close the circuit and permit a discharge current $I_{dh}$ to flow in the direction of the arrow 20. It is important to note that the direction of the current charging the battery is the opposite of the current discharging the battery. As will be more fully appreciated from the description below, this current direction change over the charge/discharge cycle in combination with the parasitic currents create the afore-mentioned cell imbalance.

Each of the electrolytic resistences $R_i$ in the battery circuit model 12 are connected at one end to a line 22. The line 22 represents an electrolyte conveying manifold which distributes the electrolyte to each of the cells in the cell stack 13. Although this manifold also contains an electrolytic resistance broken into segments between the electrolytic resistances $R_i$, the magnitude of the manifold resistance is much smaller than that of the electrolytic resistance $R_i$ and may be neglected for simplicity. Each of the electrolytic resistances $R_o$ are connected at one end to a line 24. The line 24 may represent an electrolytic conveying channel which collects the electrolyte being drained or removed from the cells, or may simply represent a point where the electrolyte from each of the cells is discharged or returned to the electrolyte reservoir. An electrolytic resistance $R_s$ represents the resistance associated with the electrolyte reservoir, as well as the conduits and the pump necessary to circulate the electrolyte through the cells. The electrolytic resistance $R_s$ is connected to the line 22 at a node C and to the line 24 at a node D. Accordingly, the electrolytic resistance $R_s$ also models the connection between the conduits supplying electrolyte to the cells from the reservoir and the conduits returning the electrolyte to the reservoir from the cells. From the foregoing description of the electrolytic connections joining the cells, it should be appreciated that the battery being modeled provides for at least one common electrolytic medium, which is in continuous communication with the cells of the battery as it circulates through the cells.

Figure 3:
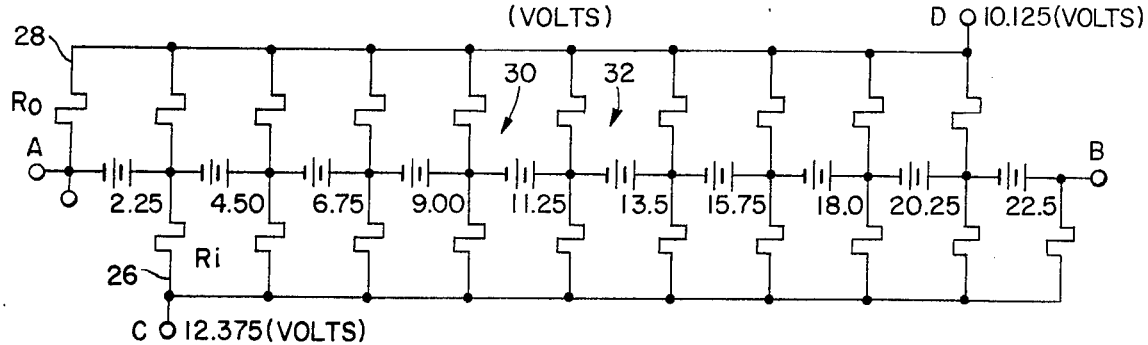
FIG. 3 is a schematic diagram of the battery model of FIG. 2, particularly illustrating the voltages at each node in the circuit during the charging of the battery.
Figure 4:
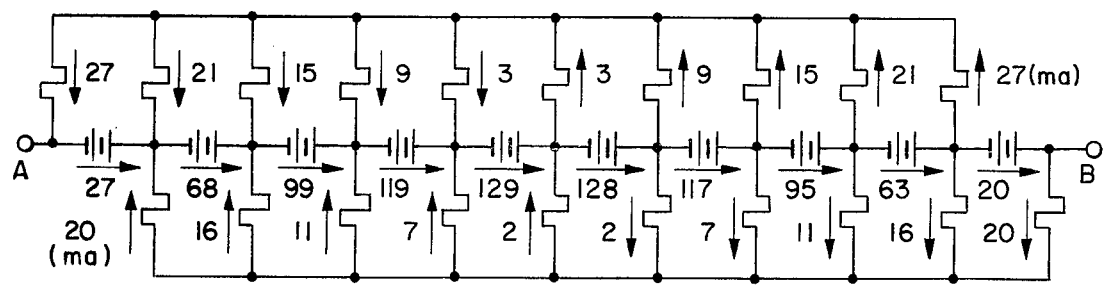
FIG. 4 is a schematic diagram of the battery model of FIG. 3, particularly illustrating the parasitic currents flowing in each branch of the circuit during the charging of the battery.

Referring to FIGS. 3 and 4, a pair of abridged schematic diagrams of the battery circuit model 12 are shown. These diagrams are used herein to illustrate the nature, magnitude and direction of the parasitic currents flowing through the cell stack 13. It should first be observed that the electrolytic resistance $R_s$ has been deleted. This modification is intended to simplify the circuit analysis required to calculate the magnitudes of the parasitic currents, and only has an insignificant effect on these calculations. This modification also permits the parasitic currents flowing through the conduits supplying electrolyte to the cells to be considered independently of the parasitic currents flowing through the conduits returning the electrolyte to the reservoir. Secondly, it should be observed that the voltage source $V_{ch}$ used to charge the battery and the resistive load $R_{dh}$ used to discharge the battery have also been deleted. This modification is intended to reflect the fact that the parasitic currents flow independently of the charge or discharge currents. As long as the battery is at least partially charged and the electrolytic paths are not interrupted, such as by ceasing the flow of electrolytic to the cells, then the parasitic currents will flow through the cell stack 13, even when the battery is in an open circuit condition.

In order to illustrate the direction and magnitude of the parasitic currents, typical values in one form of a zinc-chlorine battery will be employed for the voltage sources $V_c$ and the electrolytic resistances $R_i$ and $R_o$ in the battery circuit model 12. Accordingly, it will be assumed that each of the electrolytic resistances have a value of 500 (ohms), and each of the electrolytic resistances $R_o$ have a value of 375 (ohms). For the voltage sources $V_c$ it will be assumed that the battery is being charged and that the voltage across each cell is 2.25 (volts).

FIG. 3 particularly illustrates the magnitude of the voltages at each node in the battery circuit model 12. For example, the voltage at the negative terminal or node A is 0.0 (volts), and the voltage at the positive terminal or node B is 22.5 (volts). Similarly, the voltage at the node C is 12.375 (volts), and the voltage at the node D is 10.125 (volts). The voltages at the nodes C and D represent one half of the voltage across all of the parasitic current paths or branches supplying electrolytic to the cells or returning electrolyte to the reservoir. Each of the electrolytic resistances $R_i$ and $R_o$ provide a parasitic current branch in the battery circuit model 12. For example, the end cell 14 includes an input parasitic current branch 26 supplying electrolyte to the cell, and an output parasitic current branch 28 returning the electrolyte to the reservoir.

FIG. 4 particularly illustrates the magnitude of the parasitic currents flowing through each of the parasitic current branches and through each of the cells in the battery circuit model 12. For example, the current flowing through the input parasitic current branch 26 of the end cell 14 is 20.0 (ma), and the current flowing through the output parasitic current branch 28 is 27.0 (ma). It is important to note that the direction of the parasitic currents reverse at the center of the battery circuit model 12. For the first five cells, beginning at the end cell 14, the parasitic currents are directed inwardly toward the cells. This causes the parasitic currents to accumulate progressively through the first five cells. For the second five cells, concluding with the end cell 16, the parasitic currents are directed outwardly from the cells. This causes the parasitic currents to diminish progressively through the second five cells. As will be appreciated by those skilled in the art, this current reversal will occur when the magnitude of the cell voltage through the cell stack increases to and then exceeds the magnitude of the voltages at the nodes C and D. Since the voltages at nodes C and D will always be approximately one half of the voltage across the cell stack, the parasitic current reversal will always occur approximately at the center of the cell stack. Thus, the maximum or greatest parasitic current flow through the cells in the battery will always occur at the center cells, such as the cells 30 and 32 in the cell stack 13. Similarly, the minimum parasitic current flow through the cells in the battery will always occur at the end cells, such as the end cells 14 and 16 in the cell stack 13.

The parasitic currents illustrated in FIG. 4 have two adverse effects on the battery or cell stack 13. Firstly, these currents cause the cells to discharge in a non-useful manner, and hence may be referred to as parasitic discharge currents. Since the parasitic discharge currents merely circulate through the electrolytic paths rather than being applied to a useful load, these currents represent a loss to the battery which decreases the energy efficiency otherwise achievable. Secondly, the parasitic discharge current flow through the cell stack 13 is not uniform. Accordingly, each cell will be discharged at a different rate, with the center cells being discharged at a higher rate than the end cells. This variation in the parasitic discharge current through the cell stack creates the aforementioned cell imbalance in the following manner. During the charging of the battery, the charge current $I_{ch}$ (shown in FIG. 2) opposes the direction of the parasitic discharge current, and will reduce the amount of the charge current utilized to charge the cells. For example, assuming that the charge current $I_{ch}$ is 1.0 (amps), then the current actually utilized to charge the end cell 16 would be 0.98 (amps). Similarly, the current actually used to charge the center cell 32 would be 0.872 (amps). Thus, it will be seen that the center cells will be charged at a lower rate than the end cells, and hence store less energy than the end cells.

During the discharging of the battery, the discharge current $I_{dh}$ has the same direction as the parasitic discharge current. The parasitic discharge current then adds to the discharge current, and thereby increases the total amount of current utilized to discharge the battery. Accordingly, the center cells 30 and 32 of the cell stack 13 will be discharged at a higher rate than the end cells 14 and 16. At this point it should be noted that the parasitic discharge current during discharge will be lower than that during charge, as the voltage across the cells will be decreased. Nevertheless, over the charge/discharge cycle the cells which were charged at a lower rate will be discharged at a higher rate, and the cells which were charged at a higher rate will be discharged at a lower rate. This phenomena is graphically depicted in FIG. 5.

Figure 5:
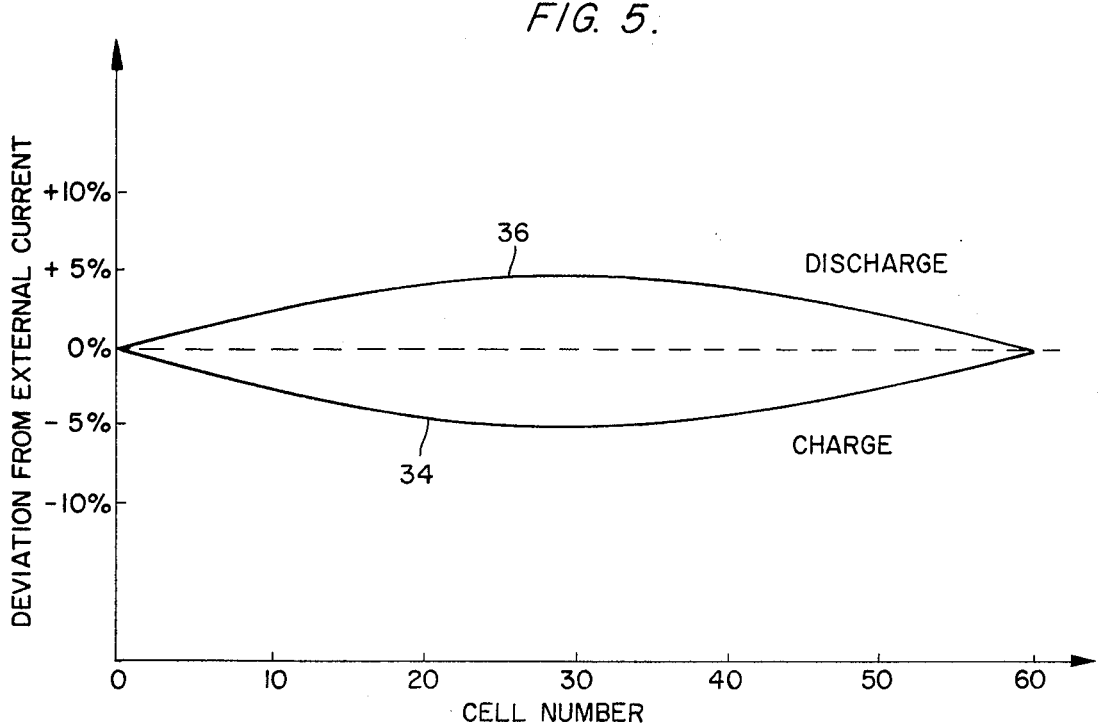
FIG. 5 is a graph illustrating the effect of the parasitic currents on the charge and discharge currents flowing through the cells in a sixty cell battery.

FIG. 5 is a graph illustrating the effect of the parasitic discharge currents over a charge/discharge cycle in a battery having sixty cells connected electrically in series. A curve 34 illustrates the decrease or reduction in the current utilized to charge the cells in terms of a percentage deviation from the external charge current provided by a suitable source of d.c. electrical power. For example, the current utilized to charge the center cells (nos. 30 and 31) is approximately 5% less than the available charge current. A curve 36 illustrates the increase in the current utilized to discharge the cells above the external discharge current flowing through a suitable resistive load. For example, the current utilized to discharge the center cells is approximately 4% greater than the discharge current flowing through the resistive load. This difference between the magnitude of the charge curve 34 and the discharge curve 36 is reflective of the fact that the magnitude of the parasitic discharge currents will be lower during the discharging of the battery than during the charging of the battery. It should be understood that the magnitudes of the curves 34 and 36 are intended to be illustrative only, and that they will depend upon the particular battery construction employed.

FIG. 5 illustrates that not only will the center cells of the battery store less energy than the end cells, but that the energy stored in the center cells will be more quickly dissipated than in the end cells. Accordingly, the center cells will be discharged before the end cells over a single charge/discharge cycle. This cell imbalance will become progressively worse during subsequent cycles unless the battery is fully discharged after each cycle. Even in batteries which are capable of being fully discharged without any harmful effects, the discharge will take more time and thereby decrease the energy efficiency otherwise achievable.

Another aspect of the parasitic current problem is its relation to the number of cells in the battery which are connected electrically in series. As will be shown with reference to FIG. 6, the magnitudes of the parasitic currents do not increase linearly with the number of cells in the battery. Rather, the magnitudes of the parasitic currents increase or are generally proportional to the number of cells squared. Accordingly, a heavy penalty is paid when it is necessary to provide a large number of cells connected electrically in series in order to achieve the overall battery voltage required for a certain application. An electric vehicle is one example of such an application, where typically the voltage necessary to drive the electric motors is on the order of 100 (volts). Thus, in most batteries suitable for providing an energy source in an electric vehicle, 40 to 80 cells or unit cells would be required to be connected electrically in series.

Figure 6:
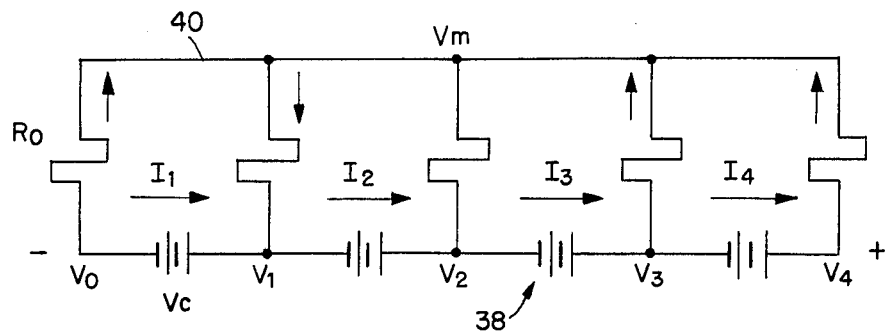
FIG. 6 is a schematic diagram of a circuit model used to develop an equation for predicting the magnitude of the parasitic currents.

Referring to FIG. 6, a circuit model 38 used to develop an equation for predicting the magnitudes of the parasitic currents in a battery is shown. The circuit model 38 comprises four independent voltage sources $V_c$, and five electrolytic resistances $R_o$ connected at one end to a line 40. Hence, the circuit model 38 in general represents a portion of the battery circuit model 12 of FIG. 2. Each node in the circuit model 38 is identified by a voltage symbol, such as $V_m$ for the node along the line 40, and $V_o$ through $V_4$ for the remaining nodes in the circuit model. Similarly, the parasitic current flow through the cells is identified by the current symbols $I_1$ through $I_4$. These currents may be calculated from the following equations:

$$I_1 = \frac{V_m - V_0}{R_o} \tag{1}$$

$$I_2 = \frac{V_m - V_0}{R_o} + \frac{V_m - V_1}{R_o} \tag{2}$$

$$I_3 = \frac{V_m - V_0}{R_o} + \frac{V_m - V_1}{R_o} + \frac{V_m - V_2}{R_o} \tag{3}$$

$$I_4 = \frac{V_m - V_0}{R_o} + \frac{V_m - V_1}{R_o} + \frac{V_m - V_2}{R_o} + \frac{V_m - V_3}{R_o} \tag{4}$$

The mid-voltage $V_m$ may be calculated from the equation:

$$V_m = \frac{N \cdot V_c}{2} + V_0, \tag{5}$$

where N is the total number of cells connected electrically in series. Assuming that the voltage $V_0$ is equal to zero volts, then equation (5) becomes:

$$V_m = \frac{N \cdot V_c}{2} \tag{6}$$

Furthermore, under this assumption the voltages $V_1$ through $V_4$ may be calculated from the following equations:

$$V_1 = 1 \cdot V_o, \ V_2 = 2 \cdot V_o, \ V_3 = 3 \cdot V_o, \text{ and } V_4 = 4 \cdot V_c \quad (7)$$

Substituting equations (6) and (7) into equation (4), the expression for the current $I_4$ becomes:

$$I_4 = 4 \cdot \frac{N \cdot V_c}{2 \cdot R_o} - 1 \cdot \frac{V_c}{R_o} - 2 \cdot \frac{V_c}{R_o} - 3 \cdot \frac{V_c}{R_o} \quad (8)$$

This equation may be generalized to determine the parasitic current through any cell in the battery, such as the current through cell K:

$$I_k = K \cdot \frac{N \cdot V_c}{2 \cdot R_o} - \frac{V_c}{R_o} \sum_{K=0}^{K=K-1} K \quad (9)$$

This equation may be simplified by first modifying equation (9) to read:

$$I_k = K \cdot \frac{N \cdot V_c}{2 \cdot R_o} - \frac{V_c}{R_o} \sum_{K=0}^{K=K} K + \frac{V_c}{R_o} \cdot K \quad (10)$$

Then the following equivalent expression is substituted into equation (10):

$$\sum_{K=0}^{K=K} K = \frac{K \cdot (K+1)}{2}, \quad (11)$$

and the expression for the current $I_k$ becomes $$I_k = K \cdot \frac{N \cdot V_c}{2R_o} - \frac{V_c}{R_o} \cdot \frac{K \cdot (K+1)}{2} + \frac{V_c}{R_o} \cdot K \quad (12)$$

Then, further simplifying equation (12), $$I_k = K \cdot \frac{N \cdot V_c}{2R_o} - \frac{V_c \cdot K^2}{2R_o} - \frac{V_c K}{2R_o} + \frac{V_c \cdot K}{R_o} \quad (13)$$

$$I_k = K \cdot \frac{N \cdot V_c}{2R_o} - \frac{V_c \cdot K^2}{2R_o} + \frac{V_c \cdot K}{2R_o} \quad (14)$$

Since the maximum parasitic current loss occurs at the center of the battery, equation (14) may be further simplified by solving for the parasitic current through one of the center cells. Accordingly, the value for cell K becomes:

$$K = \frac{N}{2} \quad (15)$$

Substituting equation (15) into equation (14), the parasitic current $I_k$ through the center cell K becomes:

$$I_k(\max) = \frac{N^2 \cdot V_c}{4 \cdot R_o} - \frac{V_c \cdot N^2}{8 \cdot R_o} - \frac{V_c \cdot N}{4 \cdot R_o} \quad (16)$$

$$I_k(\max) = \frac{N^2 \cdot V_c}{8 \cdot R_o} - \frac{N \cdot V_c}{4 \cdot R_o} \quad (17)$$

However, when the total number of cells N connected electrically in series is relatively large, such as 40 to 80 cells, the equation (17) for determining the maximum parasitic current flow through the battery may be approximated by deleting the second term in the equation.

Accordingly, the equation (17) may be modified to become:

$$I_k(\max) = \frac{N^2 \cdot V_c}{8 \cdot R_o} \quad (18)$$

Thus, it will be seen that the magnitude of the parasitic current is proportional to the number of cells in the battery squared. It may also be shown by a similar analysis that the parasitic current flow due to both the electrolytic paths supplying electrolyte to the cells and returning the electrolyte to the reservoir may be approximately calculated from the following equation:

$$I_k(\max) = \frac{N^2 \cdot V_c}{8} \cdot \left( \frac{1}{R_o} + \frac{1}{R_i} \right) \quad (19)$$

Figure 7:
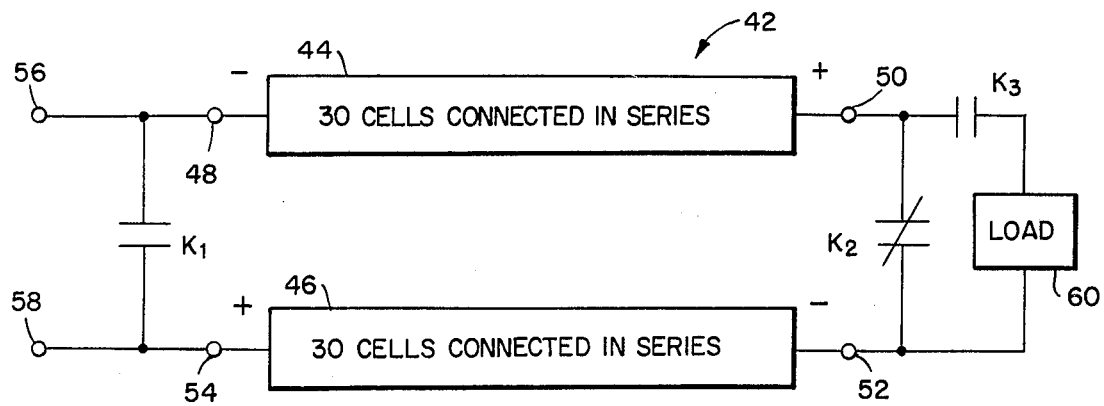
FIG. 7 is a schematic diagram of a sixty cell battery in accordance with the present invention.

Referring to FIG. 7, a schematic diagram of a sixty cell battery circuit 42 constructed in accordance with the present invention is shown. The battery circuit 42 is provided with two groups of cells or cell stacks 44 and 46, with the cells in each cell stack connected electrically in series. The cell stack 44 includes a negative terminal 48 and a positive terminal 50. Similarly, the cell stack 46 includes a negative terminal 52 and a positive terminal 54. These terminals may be of any suitable constructiion and need only be such as to provide externally available points of connection, whereby the cell stacks 44 and 46 may be connected electrically as follows. Connected across the negative terminal 48 of the cell stack 44 and the positive terminal 54 of the cell stack 46 is a set of normally open relay or switch contacts $K_1$. For illustrative purposes, the terminals 48 and 54 are extended to provide a pair of terminals 56 and 58 to which a suitable source of d.c. electrical power may be connected in order to charge the cell stacks 44 and 46. Connected across the positive terminal 50 of the cell stack 44 and the negative terminal 52 of the cell stack 46 is a set of normally closed relay contacts $K_2$. Also connected across the terminals 50 and 52 is a set of normally open relay contacts $K_3$ in series with a suitable resistive load 60 used to discharge the cell stacks 44 and 46.

The method of minimizing cell imbalances in accordance with the present invention is provided by operating the battery circuit 42 as follows. During the charging of the battery, a suitable source of d.c. electrical power is connected across the terminals 56 ad 58, and the state of the relay contacts $K_1$, $K_2$, and $K_3$ are in the normal states illustrated in FIG. 7. That is, the relay contacts $K_1$ are open, the relay contacts $K_2$ are closed and the relay contacts $K_3$ are open. Accordingly, the charge current from the power source will flow through the cell stack 46 from the positive terminal 54 to the negative terminal 52, and continue through the cell stack 44 from the positive terminal 50 to the negative terminal 48. During the discharging of the battery, the power source is disconnected from the terminals 56 and 58, and the relay contacts are switched to their reverse states. That is, the relay contacts $K_1$ are closed, the relay contacts $K_2$ are opened and the relay contacts $K_3$ are closed. Accordingly, the discharge current will flow through the cell stack 46 from the negative terminal 52 to the positive terminal 54, and continue through the cell stack 44 from the negative terminal 48 to the positive terminal 50. Thus, it will be seen that the terminals 50 and 52 of the cell stacks 44 and 46 which were connected electrically together during the charging of the battery are connected across the load 60 during the discharging of the battery. Similarly, the terminals 48 and 54 of the cell stacks 44 and 46 which were connected across the power source during the charging of the battery are connected electrically together during the discharging of the battery. Accordingly, the connections of the cell stack 44 to the cell stack 46 are reversed from charge to discharge. The result of this reversal is that the cells of the cell stacks 44 and 46 which were the end cells during the charging of the battery become the center cells during the discharging of the battery. Similarly, the center cells of the cell stacks 44 and 46 during the charging of the battery become the end cells during the discharging of the battery. Hence, during the discharging of the battery the battery stacks 44 and 46 may be referred to as being in an inverted sequence.

Figure 8:
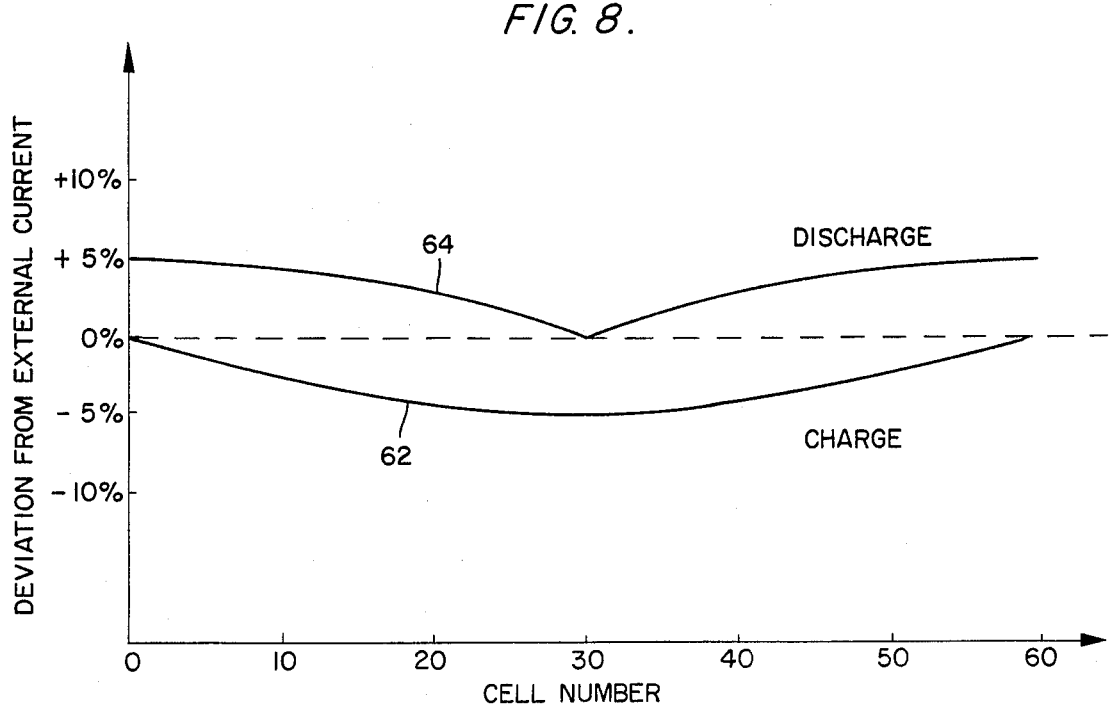
FIG. 8 is a graph illustrating the effect of the parasitic currents on the charge and discharge currents flowing through the cells of the sixty cell battery shown in FIG. 7.

The effect of the foregoing method of minimizing cell imbalances is graphically depicted with reference to FIG. 8, which illustrates the percentage current deviations during charge and discharge in a sixty cell battery. The graph of FIG. 8 may be directly related to the battery circuit 42 of FIG. 7 by assuming that each of the cell stacks 44 and 46 contain thirty cells connected electrically in series. A curve 62 illustrates the decrease in the current utilized to charge the cells from the external charge current provided by the power source. The curve 62 in this figure is the same as the curve 34 shown in FIG. 5. Accordingly, it will be appreciated that the method according to the present invention does not affect the parasitic current losses during the charging of the battery. A curve 64 illustrates the increase in the current utilized to discharge the cells above the external discharge current flowing through the load 60. The curve 64 should be compared with the curve 36 shown in FIG. 5. The curve 64 represents the curve 36 broken into two equal segments (between cell Nos. 30 and 31) with the two segments reversed. Accordingly, the curves 62 and 64 illustrate that in accordance with the method of the present invention, the cells with the greatest parasitic current losses during the charging of the battery cell Nos. 30 and 31) have the least parasitic current increases during the discharging of the battery. Similarly, the cells with the least parasitic current losses during the charging of the battery (cell Nos. 1 and 60) have the greatest parasitic current increases during the discharging of the battery. With reference to the battery circuit 42 of FIG. 7, the cells with the greatest parasitic current losses during the charging of the battery are the cells nearest to the positive terminal 54 of the cell stack 46 and the cells nearest to the negative terminal 48 of the cell stack 44. Likewise, the cells with the least parasitic current losses during the charging of the battery are the cells nearest to the positive terminal 50 of the cell stack 44 and the cells nearest to the negative terminal 52 of the cell stack 46.

It should be appreciated that the curves illustrated in FIGS. 5 and 8 are instantaneous in nature and that the imbalance between the cells will also be to some extent a function of time. Preferably, the rates at which the battery is charged and discharged will be such as to provide charge and discharge time periods which minimize the imbalance between the cells.

It should be noted that the method according to the present invention utilizes the fact that the maximum parasitic current losses occurs at the center cells of the battery. Thus, it is preferred that the battery be provided with two groups of cells which contain an equal number of cells connected electrically in series. These two groups of cells may take a variety of forms, such as the cell stacks 44 and 46 of the battery circuit 42. Alternatively, each of the groups of cells may be comprised of a plurality of cell stacks, and the cell stacks in each group may be connected electrically in series or parallel.

It should also be noted that the principles of the present invention are applicable to secondary batteries in an open circuit or standby condition, such as between the charging and discharging phases. As stated above, as long as a battery is at least partially charge and there is sufficient electrolyte in the conduits to create the necessary conductive paths and both reactant species have access to the electrodes, then the parasitic currrents will flow. However, the parasitic currents may be substantially reduced by electrically disconnecting the two groups of cells. Thus, in FIG. 7, the cell stack 44 may be electrically disconnected from the cell stack 46 by opening the relay contacts $K_1$, $K_2$ and $K_3$. This will effectively divide the number of cells connected electrically in series in the battery in half, thereby resulting in a substantial reduction in the parasitic current flow.

The various embodiments which have been set forth above were for the purpose of illustration and were not intended to limit the invention. It will be appreciated by those skilled in the art that various changes and modifications may be made to these embodiments described in this specification without departing from the spirit and scope of the invention as defined by the appended claims.

What is claimed is:

1. A method of minimizing cell imbalances due to parasitic currents in a secondary electrochemical energy storage device having a plurality of cells formed in two groups with said cells in each of said groups connected electrically in series, and a common electrolyte in communication with each of said cells in said groups of cells, comprising the steps of:
   charging said energy storage device with said groups of cells connected electrically in series; and
   discharging said energy storage device with said groups of cells reconnected electrically in series in an inverted sequence.

2. The method according to claim 1 wherein the ends of said groups of cells which were connected together during said charging are connected across a load during said discharging, and the ends of said groups of cells which are connected across a source of D.C. electrical power during said charging arc connected together during said discharging.

3. The method according to claim 2 wherein the cells in said groups of cells with the greatest parasitic current losses during said charging have the least parasitic current increases during discharging, and the cells in said group of cells with the least parasitic current losses during said charging have the greatest parasitic current increases during said discharging.

4. The method according to claim 3, wherein said groups of cells each comprise an equal number of cells connected electrically in series.

5. The method according to claim 4 wherein each of said groups of cells further comprise a plurality of cell stacks, each including a plurality of cells connected electrically in series and a positive and negative terminal connected at opposite ends thereof.

6. The method according to claim 5 wherein said cell stacks in each of said groups of cells are connected electrically in series.

7. The method according to claim 6 wherein said cell stacks in each of said groups of cells are connected electrically in parallel.

8. The method according to claim 4 wherein said energy storage device is a secondary battery.

9. The method according to claim 8, wherein said common electrolyte of said secondary battery circulates through said cells.

10. The method according to claim 9, wherein said energy storage device is a metal-halogen battery.

11. The method according to claim 10, wherein said metal-halogen battery is a zinc-chloride battery.

12. A method of minimizing cell imbalances due to parasitic currents in a secondary electrochemical energy storage device having at least a first and second cell stack, each of said cell stacks including a plurality of cells connected electrically in series and a positive and negative terminal connected at opposite ends thereof, and a common electrolyte in communication with each of said cells in said cell stacks, comprising the steps of:
  (a) charging said energy storage device with said positive terminal of said first cell stack connected to said negative terminal of said second cell stack; and
  (b) discharging said energy storage device with said negative terminal of said first cell stack connected to said positive terminal of said second cell stack.

13. The method according to claim 12 wherein the cells in said stacks with the greatest parasitic current losses during said charging have the least parasitic current increases during said discharging, and the cells in said cell stacks with the least parasitic losses during said charging have the greatest parasitic increases during said discharging.

14. The method according to claim 13 wherein the cells with the greatest parasitic current losses during said charging are the cells nearest said positive terminal of said first cell stack and the cells nearest said negative terminal of said second cell stack.

15. The method according to claim 14 wherein the cells with the least parasitic current losses during said charging are the cells nearest said negative terminal of said first cell stack and the cells nearest said positive terminal of said second cell stack.

16. The method according to claim 15 wherein each of said cell stacks include at least twenty cells connected electrically in series.

17. The method according to claim 16, wherein each of said cell stacks include an equal number of cells connected electrically in series.

18. The method according to claim 17 wherein said energy storage device is a metal-halogen battery.

19. The method according to claim 18 wherein said metal-halogen battery is a zinc-chloride battery.

20. A method of minimizing cell imbalances due to parasitic currents in a secondary electrochemical energy storage device having at least a first and second cell stack, each of said cell stacks including a plurality of cells connected electrically in series and a positive and negative terminal connected at opposite ends thereof, and a common electrolyte in communication with each of said cells in said cell stacks, comprising the steps of:
  (a) connecting said cell stacks electrically in series such that said positive end terminal of said first cell stack is connected to said negative end terminal of said second cell stack;
  (b) connecting a source of D.C. electrical power across said negative end terminal of said first cell stack and said positive end terminal of said second cell stack, and charging said energy storage device;
  (c) disconnecting said source of D.C. electrical power after said energy storage device is charged;
  (d) reconnecting said cell stacks electrically in series such that said negative end terminal of said first cell stack is connected to said positive end terminal of said second cell stack; and
  (e) connecting a load across said positive end terminal of said first cell stack and said negative end terminal of said second cell stack, and discharging said energy storage device.

21. The method according to claim 20 wherein the cells in said stacks with the greatest parasitic current losses during said charging have the least parasitic current increases during said discharging, and the cells in said cell stacks with the least parasitic losses during said charging have the greatest parasitic increases during said discharging.

22. The method according to claim 21, wherein each of said cell stacks include an equal number of cells connected electrically in series.

23. The method according to claim 22, wherein said energy storage device is a metal-halogen battery.

24. The method according to claim 23 wherein said metal-halogen battery is a zinc-chloride battery.

* * * * *

UNITED STATES PATENT AND TRADEMARK OFFICE
CERTIFICATE OF CORRECTION

PATENT NO. : 4,371,825
DATED : February 1, 1983
INVENTOR(S) : Chi, Michael C.; Carr, Peter It is certified that error appears in the above-identified patent and that said Letters Patent is hereby corrected as shown below:

Column 1, line 53, "ivention" should be --invention--

Column 2, line 59, "loaded" should be --load--

Column 5, line 23, "resistences" should be --resistances--

Column 6, line 6, "electrolytic" should be --electrolyte--

Column 6, line 29, "electrolytic" should be --electrolyte--

Column 10, line 29, "constructiion" should be --construction--

Column 10, line 50, "ad" should be --and--

Column 11, line 44, "31)" should be --31--

Column 11, line 47, "cell" should be --cells--

Column 12, line 17, "currrents" should be --currents--

Column 12, line 51, "are" should be -- were --

Column 12, line 52, "arc" should be --are--

Signed and Sealed this

Twenty-second Day of November 1983

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,371,825
DATED : February 1, 1983
INVENTOR(S) : Chi, Michael C. and Carr, Peter It is certified that error appears in the above-identified patent and that said Letters Patent is hereby corrected as shown below:

Column 11, line 50      delete "greatest" and substitute therefor —least—.

Column 11, line 54,      delete "least" and substitute therefor —greatest—.

Signed and Sealed this

Ninth Day of April 1985

[SEAL]

*Attest:*

DONALD J. QUIGG

*Attesting Officer*      *Acting Commissioner of Patents and Trademarks*